United States Patent
Guyot et al.

(10) Patent No.: US 9,323,630 B2
(45) Date of Patent: Apr. 26, 2016

(54) ENHANCED DATA RECOVERY FROM DATA STORAGE DEVICES

(71) Applicant: HGST Netherlands B.V., Amsterdam (NL)

(72) Inventors: Cyril Guyot, San Jose, CA (US); Zvonimir Bandic, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 298 days.

(21) Appl. No.: 14/028,002

(22) Filed: Sep. 16, 2013

(65) Prior Publication Data
US 2015/0082084 A1    Mar. 19, 2015

(51) Int. Cl.
*G06F 11/07* (2006.01)
*G06F 11/20* (2006.01)
*G06F 11/16* (2006.01)

(52) U.S. Cl.
CPC .......... *G06F 11/2094* (2013.01); *G06F 11/073* (2013.01); *G06F 11/1662* (2013.01)

(58) Field of Classification Search
CPC ....................................................... G06F 11/073
USPC ........................................ 714/6.1, 6.13, 6.2
See application file for complete search history.

(56) References Cited

U.S. PATENT DOCUMENTS

| | | | |
|---|---|---|---|
| 5,274,799 A | 12/1993 | Brant et al. | |
| 5,479,611 A * | 12/1995 | Oyama | G06F 11/1076 714/48 |
| 6,243,795 B1 | 6/2001 | Yang et al. | |
| 6,321,298 B1 | 11/2001 | Hubis | |
| 6,397,348 B1 | 5/2002 | Styczinski | |
| 7,418,622 B2 | 8/2008 | Okamoto et al. | |
| 7,536,495 B2 | 5/2009 | Ashmore et al. | |
| 7,631,218 B2 | 12/2009 | Daikokuya et al. | |
| 7,861,035 B2 | 12/2010 | Baek et al. | |
| 7,975,104 B2 | 7/2011 | Koul et al. | |
| 2005/0144382 A1 * | 6/2005 | Schmisseur | G06F 11/1076 711/114 |
| 2006/0236149 A1 | 10/2006 | Nguyen et al. | |
| 2008/0082893 A1 * | 4/2008 | Wang | G06F 11/1008 714/758 |
| 2010/0174676 A1 * | 7/2010 | Ash | G06F 11/1441 707/609 |
| 2014/0297918 A1 * | 10/2014 | Lee | G06F 12/0804 711/102 |

OTHER PUBLICATIONS

Ningfang Mi, et al.; "Enhancing Data Availability through Background Activities;" pp. 1-11; http://citeseerx.ist.psu.edu/viewdoc/download?10.1.1.145.8514&rep=rep1&type=pdf, 2008.

* cited by examiner

*Primary Examiner* — Chae Ko

(57) ABSTRACT

Systems, methods, and firmware for recovery of data from storage devices are provided herein. In one example, a data storage device is provided. The data storage device includes a storage portion and a cache portion which caches data intended for storage in the storage portion. Responsive to a recovery read command identifying requested data, the data storage device retrieves stored data corresponding to the requested data from the storage portion without retrieving cached data corresponding to the requested data from the cache portion that supersedes at least a portion of the stored data. Responsive to a cache block list command, the data storage device transfers a list identifying one or more cached blocks of the cached data. Responsive to a read command that identifies at least one cached block, the data storage device retrieves the at least one cached block.

18 Claims, 6 Drawing Sheets

ENHANCED DATA RECOVERY FROM DATA STORAGE DEVICES

TECHNICAL FIELD

Aspects of the disclosure are related to the field of data storage systems, and in particular, the transfer and recovery of data from storage devices in data storage systems.

TECHNICAL BACKGROUND

Computer and network systems such as personal computers, workstations, server systems, and cloud storage systems, typically include data storage systems for storing and retrieving data. These data storage systems can include data storage devices, such as hard disk drives, solid state storage devices, tape storage devices, and other mass storage devices. To achieve a measure of reliability and availability, these data storage systems can include multiple data storage devices in various arrays and configurations. One such data storage system is a redundant array of independent disks (RAID) and can be configured in with different architectures to satisfy various capacity, reliability, and availability requirements.

In typical arrayed storage systems that incorporate more than one data storage device, when a single data storage device fails or shows signs of failure, the data stored on the failing data storage device can be transferred to another data storage device if the failing data storage device is still accessible. This transfer of data allows for a replacement data storage device to be prepared in advance to participate in the arrayed storage system. In alternate examples, a replacement data storage device is instead prepared from data included on other data storage devices, which might incorporate parity data used to reconstruct the data stored on the failing data storage device. However, the reconstruction process is slow and resource intensive. Thus, if the failing data storage device is still accessible during failure, then data can be transferred from the failing data storage device to the replacement data storage device, saving some of the time used in reconstruction of the data from other data storage devices.

However, transfer of data from the failing data storage device to the replacement data storage device can be time consuming and can expedite complete failure of the already failing data storage device. Moreover, many data storage devices include cache portions which include data that has not yet been written to storage portions of the data storage device. In rotating media data storage devices, such as hard disk drives, these cache portions can be included on the same rotating media as the storage portions. Accessing data from failing rotating media data storage devices thus can incur large seek penalties and access delays due to having to access data from both the cache portion and storage portion of the same rotating media.

OVERVIEW

To provide enhanced data recovery or retrieval from data storage devices, such as rotating media-based hard drives, various systems, methods, and firmware are provided herein. In some examples, these systems, methods, and firmware can provide for data storage devices that include a storage portion and a cache portion which caches data intended for storage in the storage portion. Responsive to a recovery read command identifying requested data, the data storage devices retrieve stored data corresponding to the requested data from the storage portion without retrieving cached data corresponding to the requested data from the cache portion that supersedes at least a portion of the stored data. This requested data can be transferred for storage on another data storage device, such as a replacement storage device. Responsive to cache block list commands, the data storage devices transfer one or more lists identifying cached blocks of the cached data. These cache block lists can be transferred for delivery to host systems, which then issue one or more read commands based on the cache block lists. Responsive to these read commands that identify at least one cached block, the data storage devices retrieve the at least one cached block. The cached blocks can be transferred for storage on another data storage device, such as the replacement storage device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Various systems, methods, and firmware are provided herein to provide enhanced data recovery or retrieval from data storage devices, such as rotating media-based hard drives, among other data storage devices. In typical examples, these data storage devices are deployed in data storage environments, such as redundant or arrayed storage systems which provide different levels of reliability or availability of data. Many of the enhanced features discussed herein are employed in data storage devices, as well as in the host systems which interact with the data storage devices. In a first example of a storage system, FIG. 1 is presented.

Figure 1:
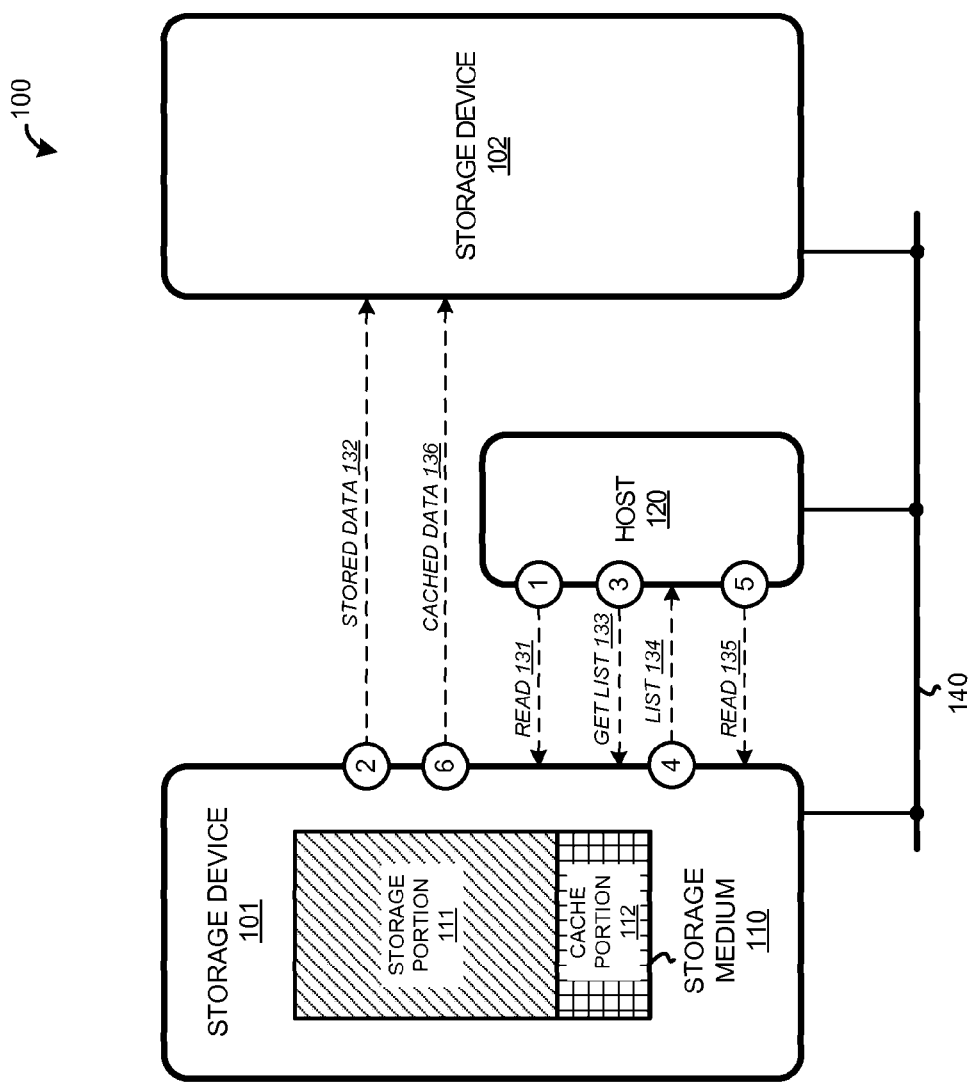
FIG. 1 is a system diagram illustrating a storage system.

FIG. 1 is a system diagram illustrating storage system 100. Storage system 100 includes storage device 101, storage device 102, and host 120. Storage device 101, storage device 102, and host 120 communicate over bus 140. Although bus 140 is shown in FIG. 1, it should be understood that one or more discrete links can be employed between the elements of storage system 100. Storage device 101 includes storage medium 110 which has two storage portions, namely storage portion 111 and cache portion 112. Although storage portion 111 and cache portion 112 are pictured on the same storage medium 110 in FIG. 1, it should be understood that one or more storage media can be employed.

In operation, storage device 101 and storage device 102 can store data for later retrieval, such as user data, system data, swap file data, and the like. In this example, storage device 102 is a replacement for storage device 101, such as in a data recovery operation, although variations are possible. Host system 120 can control at least the data transfer operations of storage device 101 and storage device 102, as well as control the transfer of data to other systems and equipment, such as to processing systems, network interfaces, and the like.

Figure 2:
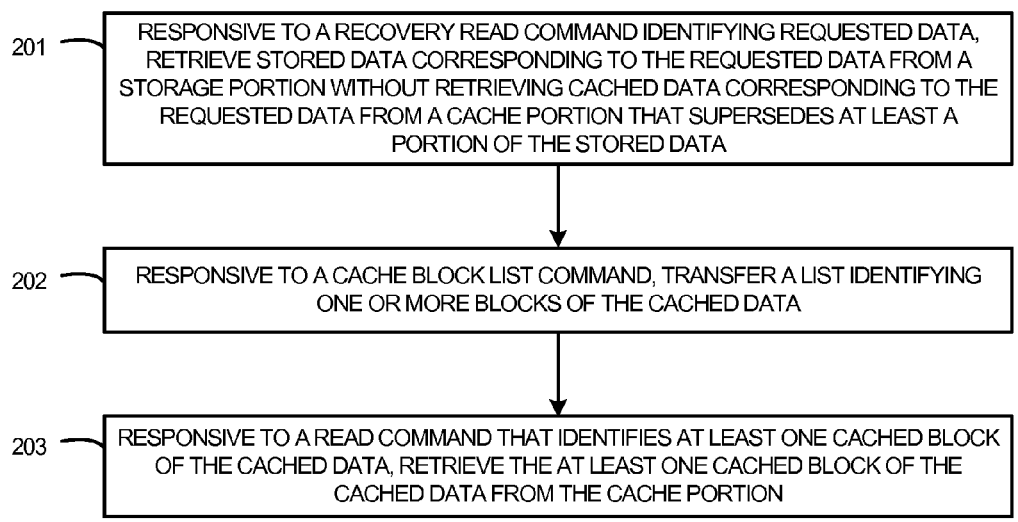
FIG. 2 is a flow diagram illustrating a method of operation of a storage device.

To illustrate recovery operations for storage system 100, FIG. 2 is presented. FIG. 2 is a flow diagram illustrating a method of operation of storage device 101. The operations of FIG. 2 are referenced below parenthetically. In FIG. 2, responsive to a recovery read command identifying requested data, storage device 101 retrieves (201) stored data corresponding to the requested data from storage portion 111 without retrieving cached data corresponding to the requested data from cache portion 112 that supersedes at least a portion of the stored data. In this example, recovery read command 131 can be issued by host 120, as indicated by the '1' sequence identifier in FIG. 1. In some examples, recovery read command 131 comprises a read command only active after storage device 101 is instructed to enter into a recovery mode, such as by host 120, where the recovery read command indicates read commands retrieve data stored in storage portion 111 and do not retrieve data stored in cache portion 112. Recovery read command 131 retrieves stored data 132 stored in storage portion 111, even if data is stored in cache portion 112 that corresponds to pending cache data which supersedes portions of stored data 132.

Thus, some of stored data 132 can comprise stale data or old data which has not yet been overwritten with data stored in cache portion 112. Recovery read command 131 can identify an address or range of addresses for retrieval of data corresponding to stored data 132. After retrieval of stored data 132, storage device 101 can transfer stored data 132 for delivery to storage device 102, as indicated by sequence identifier '2' in FIG. 1. Stored data 132 can be transferred as the requested data, even with portions of stored data 132 stale or superseded by un-transferred portions of data in cache portion 112. In some examples, the stale or superseded portions of stored data 132 are transferred as marked, such as zeroed out, or marked with a special code.

Responsive to a cache block list command, storage device 101 transfers (202) a list identifying one or more blocks of the cached data. Each cache block listed can indicate a portion of data, such as a data block of a predetermined size or addressable by a predetermined granularity. In FIG. 1, as indicated by sequence identifier '3', a get cache block list command 133 can be issued to storage device 101, such as by host 120. As indicated by sequence identifier '4', the get cache block list command 133 returns a list of block addresses 134, such as logical block addresses (LBAs) or other data identifiers for at least some of cached data 136 which is stored in cache portion 112. One or more get cache block list commands can be issued to storage device 101, and each get cache block list command can indicate a quantity of cache blocks to return, such as by requesting a list of a certain quantity of cache blocks or a certain range of cache blocks.

Responsive to a read command that identifies at least one cached block of the cached data, storage device 101 retrieves (203) the at least one cached block of the cached data from the cache portion. In this example, read command 135 can be issued by host 120, as indicated by the '5' sequence identifier in FIG. 1. For example, read command 135 retrieves cached data 136 stored in cache portion 112. Read command 135 identifies specific data to be retrieved which corresponds to the one or more of the blocks identified in operation 202 in FIG. 2, or sequence identifier '4' in FIG. 1. Thus, cached data 136 can comprise data which has not yet overwritten data stored in storage portion 111. In some examples, read command 135 comprises a normal, or non-recovery, read command active after storage device 101 is instructed to exit the recovery mode, such as by host 120, where the normal read command indicates read commands retrieve data stored in any of storage portion 111 or cache portion 112 based on the block addresses included with read command 135. After retrieval of cached data 136, storage device 101 can transfer data 136 for delivery to storage device 102, as indicated by sequence identifier '6' in FIG. 1. It should be understood that more than one read command can be issued to storage device 101 for retrieving one or more portions of cached data 136, allowing cached data 136 to be retrieved and transferred in portions.

Figure 3:
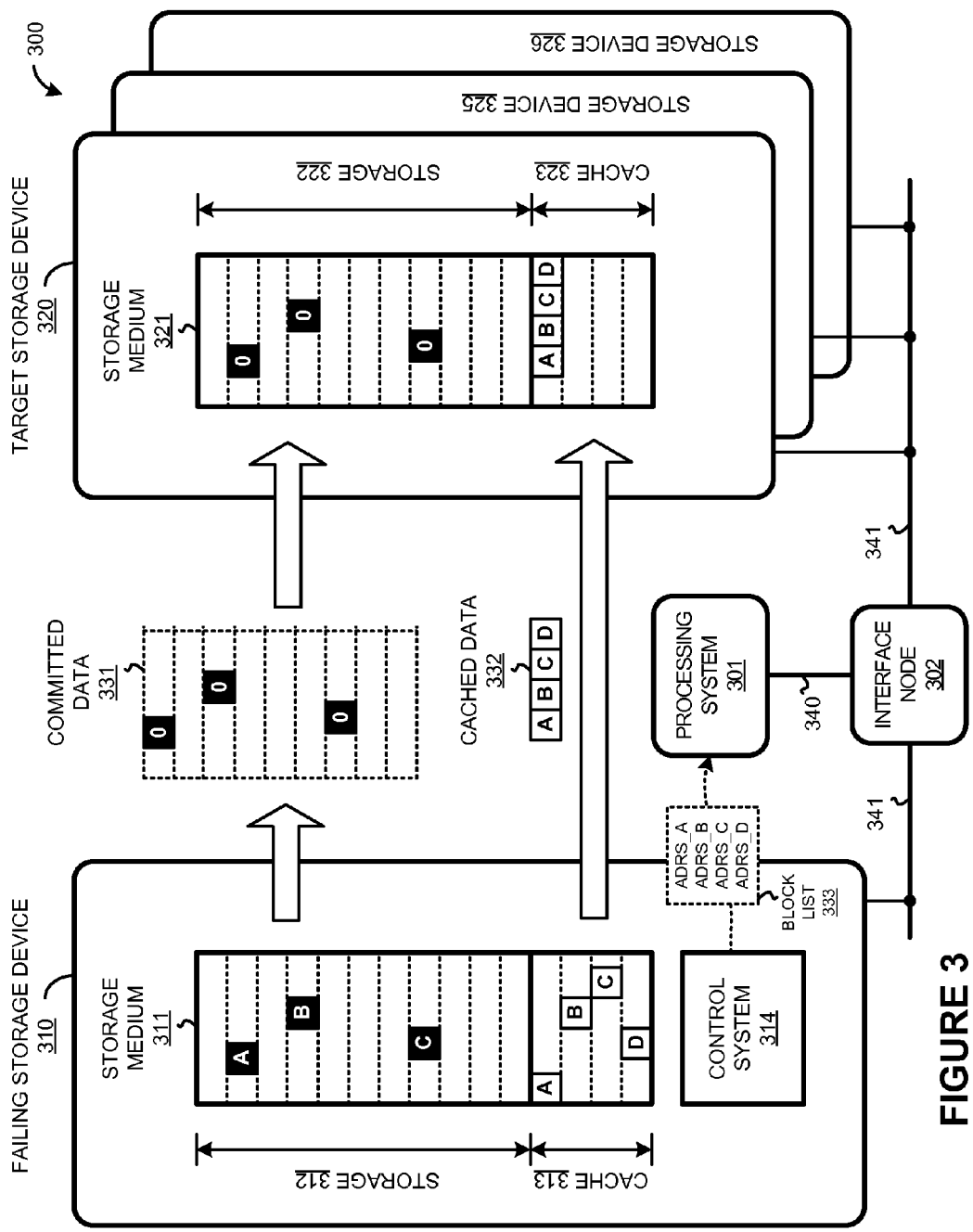
FIG. 3 is a system diagram illustrating a storage system.

As a further example of a data storage system, FIG. 3 is presented. FIG. 3 is a system diagram illustrating storage system 300. Storage system 300 includes processing system 301, interface node 302, and storage devices 310, 320, 325, and 326. In this example, storage device 310 is a failing storage device, such as a hard disk drive experiencing operational for physical failures. Storage devices 320, 325, and 326 are storage devices in a storage array, such as a RAID-type of array of hard disk drives, and at least one of storage devices 320, 325, and 326 are intended as a replacement for failing storage device 310, such as indicated by target storage device 320.

Each of storage devices 310, 320, 325, and 326 are communicatively coupled to each other and to interface node 302 by link 341. Link 341 includes portions for exchanging data and control signaling. Link 341 can be a Peripheral Component Interconnect Express (PCIe) interface, serial ATA, Serial Attached Small Computer System Interface (SAS), Integrated Drive Electronics (IDE) interface, ATA interface, Universal Serial Bus (USB) interface, wireless interface, or other communication and data interface, including combinations, variations, and improvements thereof. Processing system 301 and interface node 302 communicate over link 340, which can comprise a parallel or serial data bus or interconnect, such as Direct Media Interface (DMI) or PCIe interface, including variations, combinations, and improvements, thereof. Link 340 includes portions for exchanging data and control signaling. Although link 341 is shown as shared in FIG. 3, it should be understood that one or more discrete links can be employed between the elements of storage system 300, or link 341 can include discrete portions for direct communications between each elements connected thereto.

Storage device 320 includes storage medium 311 which has two storage portions, namely storage portion 312 and cache portion 313. In some examples, storage portion 312 is referred to as an I-region, and cache portion 313 is referred to as an E-region. Although storage portion 312 and cache portion 313 are pictured on the same storage medium 311 in FIG. 3, it should be understood that one or more storage media can be employed. In this example, storage medium 311 is a rotating magnetic medium, such as one or more hard disk drive platters for magnetic storage and retrieval of data. Likewise, storage devices 320, 325, and 326 can include similar features to storage device 310.

Storage device 310 also includes control system 314. Control system 314 includes interface, control, and communication elements and circuitry. Control system 314 includes storage medium control and interfacing elements, such as preamp and read channel circuitry for controlling, reading, writing, or seeking a rotating magnetic medium, namely storage media 311. Control system 314 also includes logic, processing elements, and communication elements for exchanging data over link 341, transferring lists of blocks in cache portion 313, receiving and executing commands received over link 341, and transferring data received over link 341 for storage in cache portion 313, storage portion 312, or combinations thereof. In typical examples, control system 314 can retrieve data from any of storage portion 312 and cache portion 313 for transfer over link 341.

Processing system 301 can include processing elements, data transfer elements, and user interface elements. In some examples processing system 301 is a central processing unit of a computing device or computing system. In other examples, processing system 301 also includes memory elements, data storage and transfer elements, controller elements, logic elements, firmware, execution elements, and other processing system components. In yet other examples, processing system 301 comprises a RAID controller processor or storage system central processor, such as a microprocessor, microcontroller, Field Programmable Gate Array (FPGA), or other processing and logic device, including combinations thereof. Processing system 301 can include, or interface with, user interface elements which can allow a user of storage system 300 to control the operations of storage system 300 or to monitor the status or operations of storage system 300. These user interface elements can include graphical or text displays, indicator lights, network interfaces, web interfaces, software interfaces, user input devices, or other user interface elements.

Interface node 302 includes circuitry and elements for handling communications over link 341, such as logic, processing portions, buffers, transceivers, and the like. Interface node 302 can comprise an interconnect device, input/output controller hub, peripheral communication hub, north bridge device, south bridge device, storage array controller, RAID controller, or other communication interface node. Interface node 302 can include interworking functions to translate communications from a first format used over link 340 to a second format used over link 341, including translating among various signaling, voltages, bus widths, serial-to-parallel signaling, parallel-to-serial signaling, data speeds, throughput variations, and the like.

Figure 4:
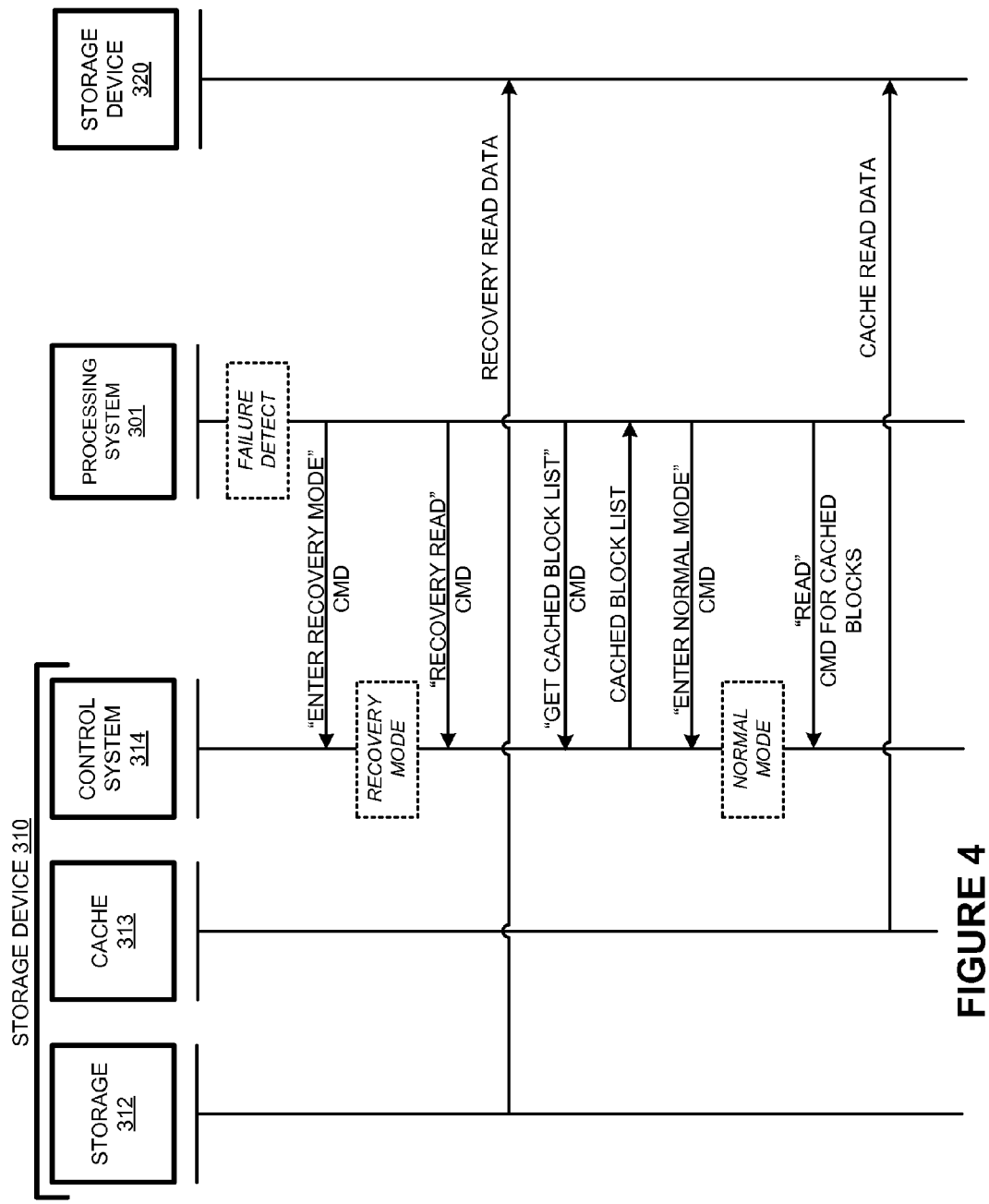
FIG. 4 is a sequence diagram illustrating a method of operation of a storage system.

As an example operation of storage system 300, FIG. 4 is presented. FIG. 4 is a sequence diagram illustrating a method of operation of storage system 300. In FIG. 4, interface node 302 is omitted for clarity. Initially, processing system 301 detects a failure condition of storage device 310, such as caused by bad checksums, physical defects of the storage medium, data transfer problems, or other failure conditions. These failure conditions can be monitored by processing system 301 for a threshold number of failures or threshold type of failures. Responsively, processing system 301 can initiate a recovery process.

The recovery process can include simply taking storage device 310 out of operation and noting that any data stored thereon as invalid or bad, such as when the entirety of storage device 310 fails. In some storage array configurations, such as RAID storage configurations, a second storage device can be already prepared for handing data storage and transfer, such as in mirroring or parity recovery modes, so that when a storage device fails, another replacement device can immediately resume the operations of the failed device.

However, in certain failure modes, storage device 310 still remains operational, and data stored thereon can be retrieved for transfer to another storage device during a recovery process, such as transfer of data from storage device 310 for storage on storage device 320. For example, in a 'hot spare' configuration of a RAID group of devices, a transfer of the data from the failing storage device to the 'hot spare' device can occur to speed up recovery operations instead of relying entirely on an XOR operation with parity or redundancy information stored on other active devices in the RAID group. The process of rebuilding a 'hot spare' device from a failing device is sometimes referred to as 'rebuild assist.'

Unfortunately, the rebuild assist process can be lengthy and cumbersome as the failing drive might have data stored in both a cache area and a storage area of a storage medium. When rotating media are employed in a storage device, seek and access times can be a large factor in transferring data from both a cache area and a storage area, as read/write heads and associated hardware must be quickly cycled between different physical areas of the rotating media corresponding to the cache area and the storage area, among other areas.

Referring still to FIG. 4, responsive to processing system 301 detecting a failure condition in storage device 310, processing system 301 initiates an enhanced rebuild assist process by first instructing storage device 310 to enter into a recovery mode. This instruction can comprise a command or other instruction transferred over links 340-341 for delivery to storage device 310. Control system 314 of storage system 310 receives this recovery mode command, and responsively enters storage device 310 into the recovery mode.

After initiating the recovery mode on storage device 310, processing system 310 initiates transfer of data from storage device 310 to storage device 320. However, instead of merely reading all available data from storage device 310, processing system 310 first issues one or more 'recovery read' commands to storage device 310. The recovery read command in this example is a read command that exhibits different behavior only during the recovery mode on storage device 310. The recovery read command retrieves data stored in storage portion 312 of storage device 310 but not from cache portion 313 of storage device 310, even if data is stored in cache portion 313 that corresponds to pending cache data which supersedes data in storage portion 312.

Specifically, in FIG. 3, storage portion 312 stores committed data 331, which has three data blocks indicated by the 'black' A, B, and C indicators. The 'black' A, B, and C data blocks comprise old data that are presently superseded by newer or replacement data stored in cache portion 313 and indicated by 'white' A, B, C, indicators. Thus, some of committed data 331 can comprise stale data or old data which has not yet been overwritten with data stored in cache portion 313. In FIG. 3, 'white' data blocks A, B, and C in cache portion 313 supersede associated 'black' data blocks A, B, and C in storage portion 312, while data block D is new data that does not supersede any data blocks in storage portion 312.

The one or more recovery read commands issued by processing system 301 to storage device 310 can include addresses of data blocks, such as a range of data for transfer. After retrieval of committed data 331, this data is transferred over link 341 as recovery data for delivery to storage device 320 and subsequent storage on storage device 320. In some examples, control system 314 tracks which data blocks in storage portion 312 correspond to stale or old data that is yet to be replaced by data in cache portion 313. Instead of transferring the old or stale data to storage device 320, storage device 310 can instead mark the old data blocks as '0' data (as indicated in FIG. 3), '1' data, or any other predetermined or random data pattern. Thus, the old or stale data is not transferred for storage on storage device 320 in FIG. 3, although the read process might still retrieve all data, including the old or stale data, in a sequential/non-random access manner. The old or stale data can be zeroed-out or otherwise marked before transfer by control system 314, but after retrieval from storage medium 311.

Thus, during the recovery read operations, data from storage portion 312 is generally retrieved in a sequential and non-random access manner from storage medium 311, avoiding seek/track delays by having to transfer cached data found in cache portion 313. Seeking and tracking of rotating media can lead to large delays in the retrieval and transfer of data, as well as further aggravate failing mechanical or magnetic storage components of storage device 310.

In some examples, storage device 310 stores data in a shingled magnetic recording (SMR) arrangement, with subsequent tracks of data stored in a tight and overlapping arrangement to increase storage density. However, writing using the shingled arrangement typically benefits from caching large amounts of data first in a non-shingled portion of the storage device before committing to a shingled portion of the storage medium to ensure large streams of sequential writes of data to the storage medium. Likewise, when reading from a storage medium using an SMR arrangement, large sequential or streaming reads can lead to greater throughput by avoiding seeks to cache portions of a storage medium. In SMR examples, storage portion 312 may comprise a shingled portion, while cache portion 313 may comprise a non-shingled portion, such as a perpendicular magnetic recording (PMR) portion. The cache portion can also comprise shingled portions. It should be understood that cache portion 313 can be included on separate storage media as storage portion 312.

Once committed data 331 is transferred for storage on storage device 320, processing system 301 requests a listing of cached data blocks from storage device 310. This listing can include a list of addresses, such as logical block addresses (LBAs) that correspond to data blocks pending in cache portion 313. This request of the cached block listing can comprise a special cache block list command issued by processing system 301, which storage device 310 responsively transfers a listing of identifiers of the cached data blocks for delivery to processing system 301. In some examples, a large number of data blocks can be cached in cache portion 313, and thus one or more partial cache block list commands can be issued by processing system 301. Each cache block list command can indicate a quantity of cache blocks that processing system 301 desires to be identified, such as the first 1000 blocks, or next 1000 blocks, and so on. As shown in FIG. 3, block list 333 is transferred for delivery to processing system 301.

Responsive to receiving block list 333, or any number of block lists, processing system 301 instructs storage device 310 to exit the recovery mode, or alternatively, to enter a 'normal' mode of operation. This normal mode of operation can be the mode of operation of storage device 310 before entering into the recovery mode of operation.

Processing system 301 then initiates reads to storage device 310 for the data identified in the cache block listing, such as those data blocks identified in block list 333. These data blocks can be specifically identified using an address, such as an LBA, in one or more read commands issued to storage device 310 by processing system 301. These read commands can be one or more standard or normal block read commands issued to storage device 310. Responsively, storage device 310 retrieves data blocks identified in the read commands.

Specifically, in FIG. 3, the read commands are issued for specific data blocks A, B, C, and D. However, since data blocks A, B, C, and D happen to be stored in cache portion 313, then storage device 310 retrieves this data from cache portion 313. In FIG. 3, data blocks A, B, and C in cache portion 313 supersede associated A, B, and C data blocks in storage portion 312, while data block D is new data that does not supersede any data blocks in storage portion 312. It should be noted that the read commands are issued while storage device 310 is in a normal mode of operation, where a read command returns the appropriate data block from any of cache portion 313 or storage portion 312, which ever portion happens to store the most recent data associated with the read commands. Since data blocks A, B, C, and D are all contained in cache portion 313 in this example, these data blocks are retrieved only from cache portion 313. Once the associated data blocks have been retrieved, these blocks are transferred as cached data 332 for storage on storage device 320, such as over link 341.

After the transfer of data from storage device 310 to storage device 320 completes, processing system 301 can complete the failure processing of storage device 310, such as by disabling power to storage device 310, indicating storage device 320 as active in a storage array, or signaling to a user of storage system 300 that storage device 310 is ready for removal from a physical enclosure, rack, or casing.

In FIG. 4, a recovery mode is discussed where a read command is issued to storage device 310 which responds by retrieving data only from a storage portion (i.e. non-cache) portion of storage device 310. In one variation, a recovery mode is not entered, and instead a special read command is employed as the recovery mode, such as identified by a new instruction, new opcode, or other identifier, different than a standard read command. This different read command would only retrieve data in the storage portion of the storage device, and ignore data stored in a cache portion of the storage device, even if the data in the cache portion supersedes the data in the storage portion. Thus, the recovery mode might only last for the duration of the special read command.

Alternatively, as discussed above for FIG. 4, if a recovery mode is employed, a standard read command might be used for all reads of data from the storage device. However, when the recovery mode is active, then the storage device would only retrieve data in the storage portion, and not retrieve data stored in a cache portion, regardless of the addresses of the data blocks requested. Likewise, when the recovery mode is not active, then the storage device would retrieve data in any of the storage area or cache area, depending upon where the most recent data happened to be presently stored.

In further examples, the recovery mode also instructs storage device 310 to disable any incoming writes, such as by not accepting incoming write data or not writing incoming write data. Furthermore, the recovery mode can also instruct storage device 310 to disable cache commit operations for transferring data from cache portion 313 to storage portion 312, and to disable any garbage collection processes which may affect where data is arranged between cache portion 313 and storage portion 312.

In yet further examples, the data in cache portion 313 is ignored and not transferred to storage device 320. This data in cache portion 313 might be ignored if lossy data is stored on storage device 310, such as video data, audio data, or other data in which loss of portions of the data might not impact usability of the data. In this vein, incremental backups might be stored on storage device 310, and when data is read from storage portion 312 but not from storage portion 313, old or previously backed up data, such as from a previous incremental backup, might be transferred with committed data 331, such as indicated by the black A, B, C data blocks. This old or previous incremental backup data might be useful to transfer as found on storage portion 312 without modification by data in cache portion 313. Thus, the recovery read command to read only data in storage portion 312 can be employed alone without subsequent use of the read to cache portion 313.

Although rotating magnetic media are discussed in FIGS. 1-4, it should be understood that the data recovery operations can be employed on any storage device or storage medium that employs a cache portion and a storage portion, such as solid state media, optical rotating media, tape media, or other storage media. Additionally, new or altered commands can be included in storage device 310, such as additional or altered firmware, front-end logic, software, executable code, processing logic, or other elements to support the new or altered commands.

Figure 5:
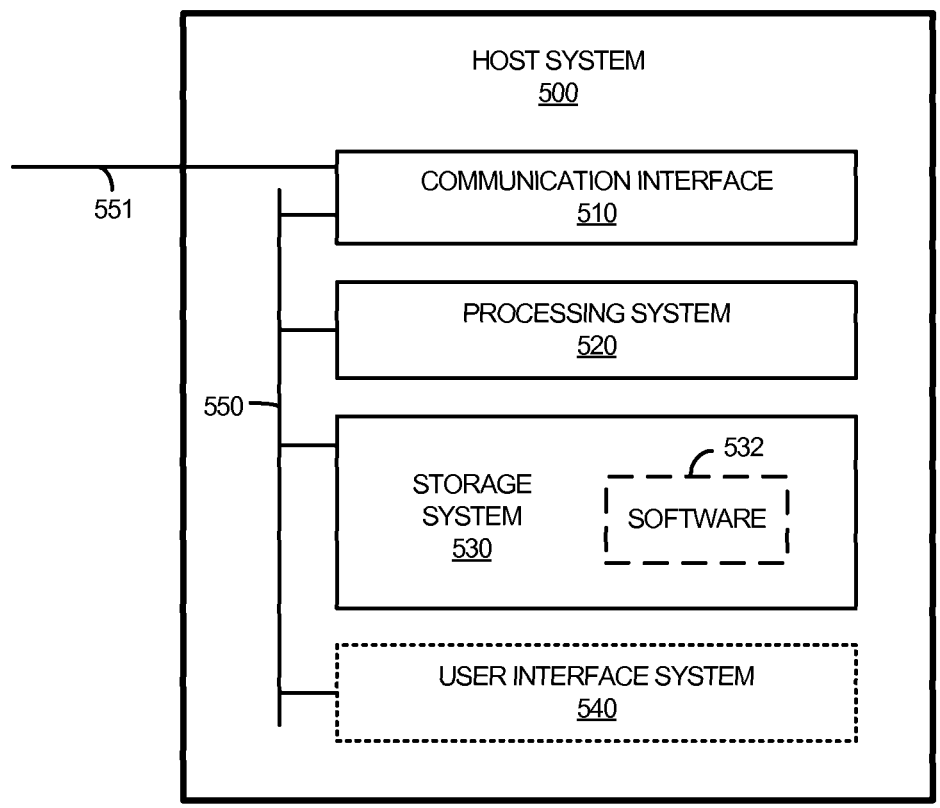
FIG. 5 is a block diagram illustrating a host system.

FIG. 5 is a block diagram illustrating a detailed view of host system 500. Host system 500 can include equipment and systems as discussed herein for host 120 in FIG. 1, processing system 301 of FIG. 3, or interface node 302 of FIG. 3, although variations are possible. Host system 500 includes communication interface 510, processing system 520, storage system 530, and optionally, user interface system 540. In operation, processing system 520 is operatively linked to communication interface 510, storage system 530, and user interface system 540 by bus 550. It should be understood that discrete links can be employed, such as network links or other circuitry. Host system 500 can be distributed or consolidated among equipment or circuitry that together forms the elements of host system 500. Host system 500 can optionally include additional devices, features, or functionality not discussed here for purposes of brevity.

Communication interface 510 includes one or more interfaces for communicating with communication networks, data busses, data links, or other devices, such as bus 140 of FIG. 1 or links 340-341 of FIG. 3. The interfaces can include any serial or parallel digital interfaces, or other communication and data interfaces, including combinations, variations, and improvements thereof. Examples of communication interface 510 include logic, transmission gates, buffers, network interface card equipment, transceivers, modems, and other communication circuitry. In this example, communication interface 510 communicates over at least link 551. Link 551 can include any communication link as described herein, such as that described for links 140 in FIG. 1 or links 340-341 in FIG. 3.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by host system 500 in general or processing system 520 in particular, direct host system 500 or processing system 520 to instruct storage devices to enter into recovery modes, issue recovery mode read commands to storage devices, handle transfer of data between storage devices, request listings of cached data blocks, interpret listings of cached data blocks to retrieve data from storage devices, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to instruct storage devices to enter into recovery modes, issue recovery mode read commands to storage devices, handle transfer of data between storage devices, request listings of cached data blocks, interpret listings of cached data blocks to retrieve data from storage devices, among other operations.

In general, software 532 can, when loaded into processing system 520 and executed, transform processing system 520 overall from a general-purpose computing system into a special-purpose computing system customized to instruct storage devices to enter into recovery modes, issue recovery mode read commands to storage devices, handle transfer of data between storage devices, request listings of cached data blocks, interpret listings of cached data blocks to retrieve data from storage devices, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in storage management operations, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, web interfaces, software interfaces, or other human-interface equipment. User interface system 540 also includes equipment to communicate information to a user of host system 500. Examples of the equipment to communicate information to the user could include displays, indicator lights, lamps, lightemitting diodes, haptic feedback devices, audible signal transducers, speakers, buzzers, alarms, vibration devices, or other indicator equipment, including combinations thereof.

Bus 550 comprises a physical, logical, or virtual communication link, capable of communicating data, control signals, and communications, along with other information. In this example, bus 550 also includes elements such as wires, circuit board traces, solid state interconnect, or other elements. In some examples, portions of bus 550 are encapsulated within the elements of host system 500, and can be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks.

Figure 6:
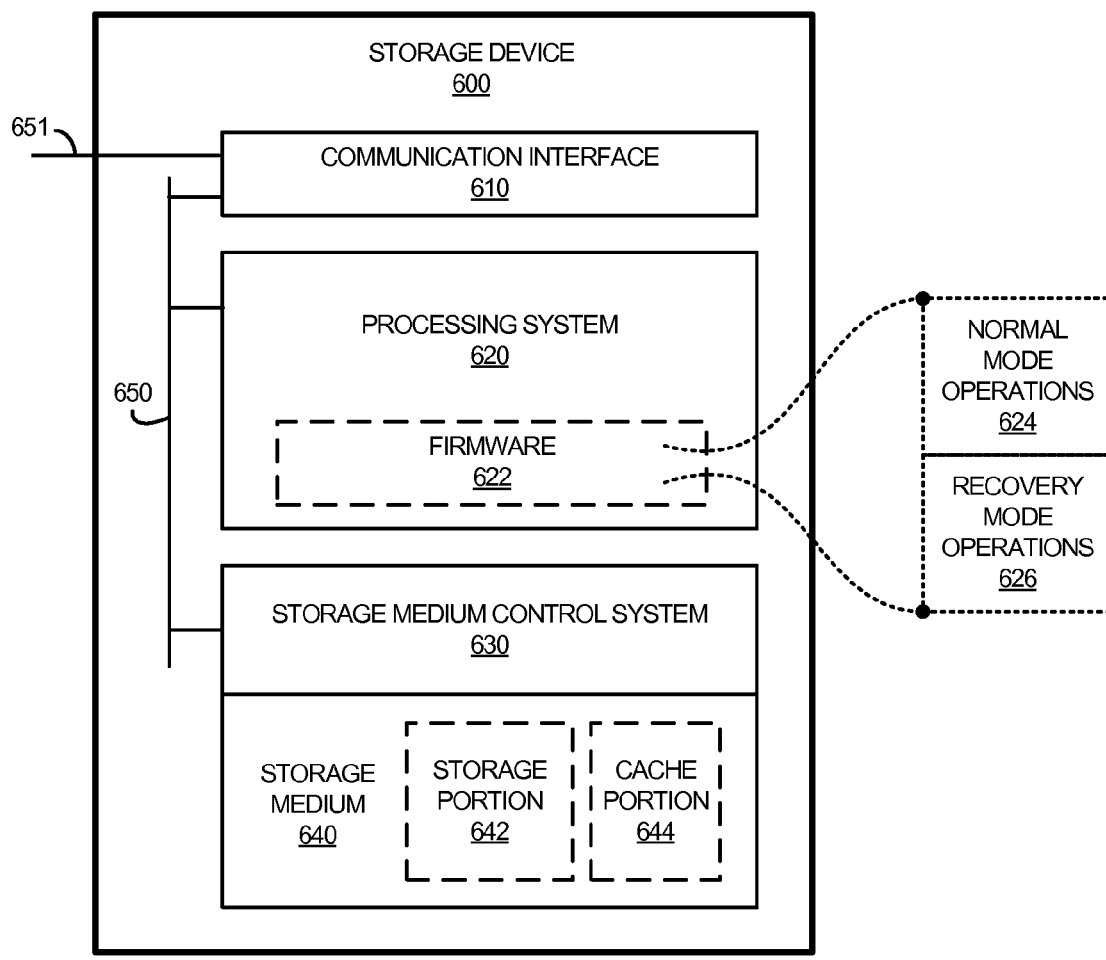
FIG. 6 is a block diagram illustrating a storage device.

FIG. 6 is a block diagram illustrating storage device 600. Storage device 600 can include equipment and systems as discussed herein for storage devices 101-102 in FIG. 1 and storage devices 310, 320, 325, and 326 in FIG. 3, although variations are possible. Storage device 600 includes communication interface 610, processing system 620, storage medium control system 630, and storage medium 640. In operation, processing system 620 is operatively linked to communication interface 610, and storage medium control system 630 by bus 650. It should be understood that discrete links can be employed, such as individual communication and control links or other circuitry. Storage device 600 can be distributed or consolidated among equipment or circuitry that together forms the elements of storage device 600. Storage device 600 can optionally include additional devices, features, or functionality not discussed here for purposes of brevity.

Communication interface 610 includes one or more interfaces for communicating with communication networks, storage data busses, storage data links, or other devices, such as bus 140 of FIG. 1 or links 340-341 of FIG. 3. The interfaces can include any serial or parallel digital interfaces, or other communication and data interfaces, including combinations, variations, and improvements thereof. Examples of communication interface 610 include logic, transmission gates, buffers, network interface card equipment, transceivers, modems, and other communication circuitry. In this example, communication interface 610 communicates over at least link 651. Link 651 can include any communication link as described herein, such as that described for links 140 in FIG. 1 or links 340-341 in FIG. 3.

Processing system 620 can comprise one or more microprocessors, microcontrollers, application specific integrated circuit (ASIC) processors, or FPGA elements and other circuitry that retrieves and executes firmware 622 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage device 600 can include any computer readable storage media readable by processing system 620 and capable of storing firmware 622, such as a computer readable storage device. The computer readable storage media that stores firmware 622 can include volatile and nonvolatile, removable and non-removable media implemented in any method or technology for storage of information, such as computer readable instructions, data structures, program modules, or other data. In addition to storage media, in some implementations the computer readable storage media can also include communication media over which firmware 622 can be communicated. The computer readable storage media that stores firmware 622 can be implemented as a single storage device but can also be implemented across multiple storage devices or subsystems co-located or distributed relative to each other. The computer readable storage media that stores firmware 622 can comprise additional elements, such as a controller, capable of communicating with processing system 620. Examples of storage media include random access memory, read only memory, flash memory, or any other medium which can be used to store the desired information and that can be accessed by an instruction execution system, as well as any combination or variation thereof, or any other type of storage media. In no case is the storage media a propagated signal.

Firmware 622 can be implemented in program instructions and among other functions can, when executed by storage device 600 in general or processing system 620 in particular, direct storage device 600 or processing system 620 to enter into a recovery mode, process recovery mode read commands to retrieve data from storage portion 642 of storage medium 640, process non-recovery mode read commands to retrieve data from cache portion 644 of storage medium 640, transfer data to other devices, receive requests for listings of cached data blocks, transfer listings of cached data bocks, among other operations. Firmware 622 can include additional processes, programs, or components, such as operating system software, database software, or application software. Firmware 622 can also comprise some other form of machine-readable processing instructions executable by processing system 620.

In at least one implementation, firmware 622 includes normal mode operations module 624 and recover mode operations module 626. Normal mode operations module 624 includes instructions executable by processing system 620 for handling read commands to retrieve data from any of storage portion 642 or cache portion 644 of storage medium 640, along with other commands, such as write commands to write data to storage medium 640. Recovery mode operations module 626 includes instructions executable by processing system 620 for handling recovery read commands to retrieve data from storage portion 642 without retrieving data from cache portion 644 of storage medium 640. Recovery mode operations module 626 also includes instructions executable by processing system 620 to determine addresses or other information for blocks of data stored in cache portion 644, provide a listing or indicators of the blocks storage in cache portion 644 to other devices, and instructions executable by processing system 620 to exit the recovery mode.

In general, firmware 622 can, when loaded into processing system 620 and executed, transform processing system 620 overall from a general-purpose computing system into a special-purpose computing system customized to enter into a recovery mode, process recovery mode read commands to retrieve data from storage portion 642 of storage medium 640, process non-recovery mode read commands to retrieve data from cache portion 644 of storage medium 640, transfer data to other devices, receive requests for listings of cached data blocks, transfer listings of cached data bocks, among other operations. Encoding firmware 622 on a computer readable storage media can transform the physical structure of the computer readable storage media. The specific transformation of the physical structure can depend on various factors in different implementations of this description. Examples of such factors can include, but are not limited to the technology used to implement the storage media of the computer readable storage media and whether the computer readable storage media are characterized as primary or secondary storage. For example, if the computer-storage media are implemented as semiconductor-based memory, firmware 622 can transform the physical state of the semiconductor memory when the program is encoded therein. For example, firmware 622 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Storage medium control system 630 includes circuitry, devices, and equipment for transferring write data to storage medium 640 and reading data from storage medium 640. In examples of rotating magnetic media, such as hard disk drives, storage medium control system 630 can comprise preamp circuitry, read channel circuitry, armatures, magnetic read/write heads, motors, servos, servo control systems, channel seek/track systems, and other circuitry and equipment. In examples of solid state media, storage medium control system 630 can include various solid state circuitry interface circuitry, such as write circuitry, step-up voltage converters, buffers, line amplifiers, and the like.

Storage medium 640 comprises one or more computer readable storage media. Storage medium 640 comprises storage portion 642 and cache portion 644. In some examples, storage portion 640 and cache portion 644 are both included on the same storage medium. In other examples, cache portion 644 can be included in separate computer readable storage medium. Storage medium 640 stores data in addressable blocks. Storage medium can comprise a rotating magnetic storage medium, which can include one or more magnetic media platters. Storage medium 640 can instead comprise one or more optical, solid state, or non-rotating magnetic storage media. In some examples, storage portion 642 comprises a shingled magnetic recording (SMR) arrangement, with subsequent circular tracks of data stored in a tight and overlapping arrangement to increase storage density, while cache portion 644 may comprise a non-shingled arrangement, such as a perpendicular magnetic recording (PMR) arrangement.

Bus 660 comprises a physical, logical, or virtual communication link, capable of communicating data, control signals, and communications, along with other information. In this example, bus 660 also includes elements such as wires, circuit board traces, solid state interconnect, or other elements. In some examples, portions of bus 660 are encapsulated within the elements of storage device 600, and can be a software or logical link. In other examples, bus 660 uses various communication media, such as air, space, metal, optical fiber, or some other signal propagation path, including combinations thereof. Bus 660 could be a direct link or might include various equipment, intermediate components, systems, and networks.

Returning to the elements of FIG. 1, storage devices 101-102 each include one or more computer readable storage media. Each of storage devices 101-102 can comprise a hard disk drive, solid state drive (SSD), flash memory device, or other computer readable storage device. The computer readable storage media of storage devices 101-102 can each include rotating magnetic storage media, such as hard disk drive media, or can include solid state storage media, optical storage media, non-rotating magnetic media, phase change magnetic media, spin-based storage media, or other storage media, including combinations, variations, and improvements thereof. In this example, storage device 101 includes two portions on storage medium 110, namely storage portion 111 and cache portion 112. In some examples, storage portion 111 and cache portion 112 are included on the same physical media as each other, and are located in different physical regions of the physical media. Also, in some examples, storage portion 111 may be included in an SMR portion of storage medium 110, while cache portion 112 may comprise a non-shingled portion, such as a perpendicular magnetic recording (PMR) portion. Although storage portion 111 and cache portion 112 are pictured on the same storage medium 110 in FIG. 1, it should be understood that one or more storage media can be employed. Storage devices 101-102 also each include communication interfaces for transferring data to and from other devices, such as over links 140, or 340-341. Storage device 101 can be an example of storage device 310 in FIG. 3 or storage device 600 in FIG. 6, although variations are possible.

Host 120 can include processing elements, data transfer elements, and user interface elements. In some examples host 120 is a central processing unit of a computing device or computing system. In other examples, host 120 also includes memory elements, data storage and transfer elements, controller elements, logic elements, firmware, execution elements, and other processing system components. In yet other examples, host 120 comprises a RAID controller processor or storage system central processor, such as a microprocessor, microcontroller, Field Programmable Gate Array (FPGA), or other processing and logic device, including combinations thereof. Host 120 can include, or interface with, user interface elements which can allow a user of storage system 100 to control the operations of storage system 100 or to monitor the status or operations of storage system 100. These user interface elements can include graphical or text displays, indicator lights, network interfaces, web interfaces, software interfaces, user input devices, or other user interface elements. Host 120 can also include interface circuitry and elements for handling communications over bus 140, such as logic, processing portions, buffers, transceivers, and the like. Interface node 302 can comprise an interconnect device, input/output controller hub, peripheral communication hub, north bridge device, south bridge device, storage array controller, RAID controller, or other communication interface node.

Bus 140 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof.

Although bus 140 is shown in FIG. 1, it should be understood that one or more discrete links can be employed between the elements of storage system 100.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
a storage medium comprising a storage portion and a cache portion, wherein the cache portion caches data for storage in the storage portion; and
a storage controller configured to:
responsive to a recovery read command identifying requested data, retrieve stored data corresponding to the requested data from the storage portion without retrieving cached data corresponding to the requested data from the cache portion that supersedes at least a portion of the stored data;
responsive to a cache block list command, transfer a list identifying one or more blocks of the cached data; and
responsive to a read command that identifies at least one cached block of the cached data, retrieve the at least one cached block of the cached data from the cache portion.

2. The data storage device of claim 1, wherein the requested data corresponds to data that is included in both the storage portion and the cache portion, and wherein the cached data comprises pending data which supersedes corresponding stale portions of the stored data included in the storage portion.

3. The data storage device of claim 1, wherein the recovery read command is only active when the data storage device is instructed to first enter into a recovery mode.

4. The data storage device of claim 1, wherein the list identifying the one or more blocks of the cached data identifies one or more logical block addresses (LBAs) corresponding to the one or more blocks of the cached data.

5. The data storage device of claim 1, wherein the recovery read command comprises a read command for retrieving the requested data on the data storage device identified by one or more logical block addresses (LBAs).

6. The data storage device of claim 1, comprising:
the storage controller further configured to:
responsive to an instruction to enter into a recovery mode, inhibit the cached data from transfer into the storage portion and inhibit incoming write data from storage in the data storage device.

7. The data storage device of claim 1, wherein the storage portion comprises a shingled magnetic recording (SMR) arrangement and the cache portion comprises a non-SMR arrangement.

8. The data storage device of claim 1, comprising:
the storage controller further configured to:
responsive to an instruction to exit the recovery mode, allow the read command to retrieve the at least one cached block of the cached data, wherein the data storage device responds to the read command while in the recovery mode by retrieving data associated with the read command from the storage portion and not from the cache portion.

9. The data storage device of claim 1, comprising:
the storage controller further configured to:
responsive to retrieving the stored data, transfer the stored data as portions of the requested data for storage on another data storage device, wherein other portions of the requested data corresponding to the cached data are transferred as zeroed out data; and
responsive to retrieving the at least one cached block of the cached data, transfer the at least one cached block of the cached data for storage on the other data storage device.

10. A method of operating a data storage device that includes a storage portion and a cache portion which caches data intended for storage in the storage portion, the method comprising:
responsive to a recovery read command identifying requested data, retrieving stored data corresponding to the requested data from the storage portion without retrieving cached data corresponding to the requested data from the cache portion that supersedes at least a portion of the stored data;
responsive to a cache block list command, transferring a list identifying one or more cached blocks of the cached data; and
responsive to a read command that identifies at least one cached block, retrieving the at least one cached block.

11. The method of claim 10, wherein the requested data corresponds to data that is included in both the storage portion and the cache portion, and wherein the cached data comprises pending data which supersedes corresponding stale portions of the stored data included in the storage portion.

12. The method of claim 10, wherein the recovery read command is only active when the data storage device is instructed to first enter into a recovery mode.

13. The method of claim 10, wherein the list identifying the one or more blocks of the cached data identifies one or more logical block addresses (LBAs) corresponding to the one or more blocks of the cached data.

14. The method of claim 10, wherein the recovery read command comprises a read command for retrieving the requested data on the data storage device identified by one or more logical block addresses (LBAs).

15. The method of claim 10, further comprising:
responsive to an instruction to enter into a recovery mode, inhibiting the cached data from transfer into the storage portion and inhibiting incoming write data from storage in the data storage device.

16. The method of claim 10, wherein the storage portion comprises a shingled magnetic recording (SMR) arrangement and the cache portion comprises a non-SMR arrangement.

17. The method of claim 10, further comprising:
responsive to an instruction to exit the recovery mode, allowing the read command to retrieve the at least one cached block of the cached data, wherein the data storage device responds to the read command while in the recovery mode by retrieving data associated with the read command from the storage portion and not from the cache portion.

18. The method of claim 10, further comprising:
responsive to retrieving the stored data, transferring the stored data as portions of the requested data for storage on another data storage device, wherein other portions of the requested data corresponding to the cached data are transferred as zeroed out data; and
responsive to retrieving the at least one cached block of the cached data, transferring the at least one cached block of the cached data for storage on the other data storage device.

* * * * *